US008656997B2

(12) United States Patent
Van Den Berg et al.

(10) Patent No.: US 8,656,997 B2
(45) Date of Patent: Feb. 25, 2014

(54) SYSTEMS AND METHODS FOR PRODUCING OIL AND/OR GAS

(75) Inventors: Claudia Van Den Berg, Hazerswoude Rijindijk (NL); Paul Clinton, The Hague (NL); Kees Van Gelder, Rijswijk (NL); Carolus Matthias Anna Maria Mesters, Sugar Land, TX (US); Patrick Guy Monin, Den Haag (NL); Gerard Mulder, The Hague (NL); Raul Valdez, Rijswijk (NL); Dean Chien Wang, Missouri City, TX (US)

(73) Assignee: Shell Oil Company, Houston, TX (US)

( * ) Notice: Subject to any disclaimer, the term of this patent is extended or adjusted under 35 U.S.C. 154(b) by 607 days.

(21) Appl. No.: 12/937,958

(22) PCT Filed: Apr. 14, 2009

(86) PCT No.: PCT/US2009/040476
§ 371 (c)(1),
(2), (4) Date: Feb. 16, 2011

(87) PCT Pub. No.: WO2009/129218
PCT Pub. Date: Oct. 22, 2009

(65) Prior Publication Data
US 2011/0132602 A1    Jun. 9, 2011

Related U.S. Application Data

(60) Provisional application No. 61/045,351, filed on Apr. 16, 2008.

(30) Foreign Application Priority Data

Apr. 14, 2008    (EP) ..................... 08154481

(51) Int. Cl.
*E21B 43/24*    (2006.01)
*E21B 43/00*    (2006.01)

(52) U.S. Cl.
USPC ................. 166/272.1; 166/266; 166/90.1

(58) Field of Classification Search
None
See application file for complete search history.

(56) References Cited

U.S. PATENT DOCUMENTS

| | | | |
|---|---|---|---|
| 2,330,934 A | 10/1943 | Thacker | 23/206 |
| 2,492,719 A | 12/1949 | Thacker | 23/206 |

(Continued)

FOREIGN PATENT DOCUMENTS

| | | | |
|---|---|---|---|
| CA | 738784 | 7/1966 | |
| EP | 581026 | 2/1994 | C01B 17/04 |

(Continued)

OTHER PUBLICATIONS

Carbon Disulfide, "4.Production, Import, Use, and Disposal", XP007908050, pp. 119-125, Jun. 29, 2001.

(Continued)

*Primary Examiner* — Angela M DiTrani

(57) ABSTRACT

A system for producing oil and/or gas comprising a mechanism for releasing at least a portion of a sulfur containing compound into a formation; a first mechanism for converting at least a portion of the sulfur containing compound into a carbon disulfide formulation and/or a carbon oxysulfide formulation, the first mechanism for converting within the formation; and a second mechanism for converting at least a portion of the carbon disulfide formulation and/or a carbon oxysulfide formulation into another compound, the second mechanism for converting within the formation.

21 Claims, 7 Drawing Sheets

(56) References Cited

U.S. PATENT DOCUMENTS

| | | | | |
|---|---|---|---|---|
| 2,636,810 A | | 4/1953 | Marisic | 23/206 |
| 2,670,801 A | | 3/1954 | Sherborne | 166/21 |
| 3,087,788 A | | 4/1963 | Porter | 23/181 |
| 3,250,595 A | | 5/1966 | Olsen | 23/206 |
| 3,345,135 A | | 10/1967 | Kerr et al. | 23/206 |
| 3,366,452 A | | 1/1968 | Lauer | 23/204 |
| 3,393,733 A | | 7/1968 | Kuo et al. | 166/8 |
| 3,402,768 A | | 9/1968 | Felsenthal et al. | 166/2 |
| 3,498,378 A | | 3/1970 | Stone et al. | 166/263 |
| 3,581,821 A | | 6/1971 | Ross | 166/245 |
| 3,647,906 A | | 3/1972 | Farley | 260/683 D |
| 3,672,448 A | | 6/1972 | Hoyt | 166/245 |
| 3,724,552 A | | 4/1973 | Snavely | 166/304 |
| 3,724,553 A | | 4/1973 | Snavely, Jr. et al. | 166/304 |
| 3,729,053 A | | 4/1973 | Froning | 166/304 |
| 3,732,166 A | | 5/1973 | Lissant | 166/304 |
| 3,754,598 A | | 8/1973 | Holloway, Jr. | 166/249 |
| 3,794,114 A | | 2/1974 | Brandon | 166/249 |
| 3,805,892 A | | 4/1974 | Haynes, Jr. | 166/245 |
| 3,822,748 A | | 7/1974 | Allen et al. | 166/269 |
| 3,823,777 A | | 7/1974 | Allen et al. | 166/266 |
| 3,838,738 A | * | 10/1974 | Redford et al. | 166/271 |
| 3,840,073 A | | 10/1974 | Allen et al. | 166/274 |
| 3,847,221 A | | 11/1974 | Allen et al. | 166/274 |
| 3,850,245 A | | 11/1974 | Allen et al. | 166/274 |
| 3,878,892 A | | 4/1975 | Allen et al. | 166/267 |
| 3,927,185 A | | 12/1975 | Meadow et al. | 423/443 |
| 3,943,160 A | | 3/1976 | Farmer, III et al. | 260/458 |
| 3,946,812 A | | 3/1976 | Gale et al. | 166/274 |
| 4,008,764 A | | 2/1977 | Allen | 166/266 |
| 4,057,613 A | | 11/1977 | Meadow et al. | 423/443 |
| 4,077,471 A | | 3/1978 | Shupe et al. | 166/275 |
| 4,122,156 A | | 10/1978 | Kittrell et al. | 423/443 |
| 4,182,416 A | | 1/1980 | Trantham et al. | 166/245 |
| 4,216,079 A | | 8/1980 | Newcombe | 208/188 |
| 4,305,463 A | | 12/1981 | Zakiewicz | 106/245 |
| 4,330,038 A | | 5/1982 | Soukup et al. | 166/267 |
| 4,393,937 A | | 7/1983 | Dilgren et al. | 166/272 |
| 4,476,113 A | | 10/1984 | Young et al. | 424/161 |
| 4,487,264 A | * | 12/1984 | Hyne et al. | 166/300 |
| 4,488,976 A | | 12/1984 | Dilgren et al. | 252/8.55 D |
| 4,543,434 A | | 9/1985 | Chang | 585/310 |
| 4,550,779 A | | 11/1985 | Zakiewicz | 166/248 |
| 4,727,937 A | | 3/1988 | Shum et al. | 166/245 |
| 4,822,938 A | | 4/1989 | Audeh et al. | 585/324 |
| 4,963,340 A | | 10/1990 | Audeh et al. | 423/444 |
| 5,014,784 A | | 5/1991 | Shen | 166/263 |
| 5,062,970 A | | 11/1991 | Muijs et al. | 252/8.554 |
| 5,065,821 A | | 11/1991 | Huang et al. | 166/245 |
| 5,076,358 A | | 12/1991 | Kissel | 166/275 |
| 5,120,935 A | | 6/1992 | Nenniger | 392/305 |
| 5,167,280 A | | 12/1992 | Sanchez et al. | 166/267 |
| 5,318,709 A | | 6/1994 | Wuest et al. | 252/8.554 |
| 5,607,016 A | | 3/1997 | Butler | 166/263 |
| 5,609,845 A | | 3/1997 | Cimini et al. | 423/648.1 |
| 5,723,423 A | | 3/1998 | Van Slyke | 510/188 |
| 5,803,171 A | | 9/1998 | McCaffery et al. | 166/245 |
| 5,826,656 A | | 10/1998 | McGuire et al. | 166/305.1 |
| 6,022,834 A | | 2/2000 | Hsu et al. | 507/259 |
| 6,136,282 A | | 10/2000 | Fisher | 423/220 |
| 6,149,344 A | | 11/2000 | Eaton | 405/128 |
| 6,241,019 B1 | | 6/2001 | Davidson et al. | 166/249 |
| 6,269,881 B1 | | 8/2001 | Chou et al. | 166/270.1 |
| 6,405,797 B2 | | 6/2002 | Davidson et al. | 166/249 |
| 6,497,855 B1 | | 12/2002 | Wachs | 423/648.1 |
| 6,506,349 B1 | | 1/2003 | Khanmamedov | 423/210 |
| 6,706,108 B2 | | 3/2004 | Polston | 106/285 |
| 6,851,473 B2 | | 2/2005 | Davidson | 166/263 |
| 6,893,620 B2 | | 5/2005 | Watson et al. | 423/224 |
| 6,919,059 B2 | | 7/2005 | Watson et al. | 423/224 |
| 6,919,296 B2 | | 7/2005 | Geus et al. | 502/325 |
| 6,946,111 B2 | | 9/2005 | Keller et al. | 423/576.2 |
| 7,025,134 B2 | | 4/2006 | Byrd et al. | 166/105 |
| 7,090,818 B2 | | 8/2006 | Stauffer | 423/443 |
| 7,128,150 B2 | | 10/2006 | Thomas et al. | 166/266 |
| 7,426,959 B2 | | 9/2008 | Wang et al. | 166/52 |
| 7,601,320 B2 | | 10/2009 | Van Dorp et al. | 423/443 |
| 7,654,322 B2 | | 2/2010 | Wang et al. | 166/266 |
| 2003/0194366 A1 | | 10/2003 | Srinivas et al. | 423/230 |
| 2004/0146288 A1 | | 7/2004 | Vinegar et al. | 392/301 |
| 2004/0159583 A1 | | 8/2004 | Mesters et al. | 208/208 |
| 2005/0189108 A1 | | 9/2005 | Davidson | 166/249 |
| 2006/0254769 A1 | * | 11/2006 | Wang et al. | 166/266 |
| 2007/0251686 A1 | | 11/2007 | Sivrikoz et al. | 166/249 |
| 2008/0023198 A1 | | 1/2008 | Hsu | 166/268 |
| 2008/0087425 A1 | | 4/2008 | Hsu et al. | 166/266 |

FOREIGN PATENT DOCUMENTS

| | | | |
|---|---|---|---|
| GB | 1007674 | 10/1965 | |
| GB | 2379685 | 3/2003 | E21B 43/16 |
| WO | WO9619638 | 6/1996 | E21B 43/22 |
| WO | WO9850679 | 11/1998 | E21B 43/40 |
| WO | WO03095118 | 11/2003 | B09C 1/00 |
| WO | WO200713177 | 11/2007 | C01B 31/26 |
| WO | WO2007127766 | 11/2007 | E21B 43/16 |
| WO | WO2007131976 | 11/2007 | C01B 31/26 |
| WO | WO2007131977 | 11/2007 | E21B 43/16 |
| WO | WO2008003732 | 1/2008 | C01B 31/26 |
| WO | WO2008034777 | 3/2008 | C01B 31/26 |

OTHER PUBLICATIONS

Wellington, et al.: Low Surfactant Concentration Enhanced Waterflooding, Society of Petroleum Engineers, SPE Annual Technical Conference & Exhibition, Dallas, Oct. 22-25, 1995, published SPE 30748, SPE Jrnl., vol. 2, Dec. 1997.

* cited by examiner

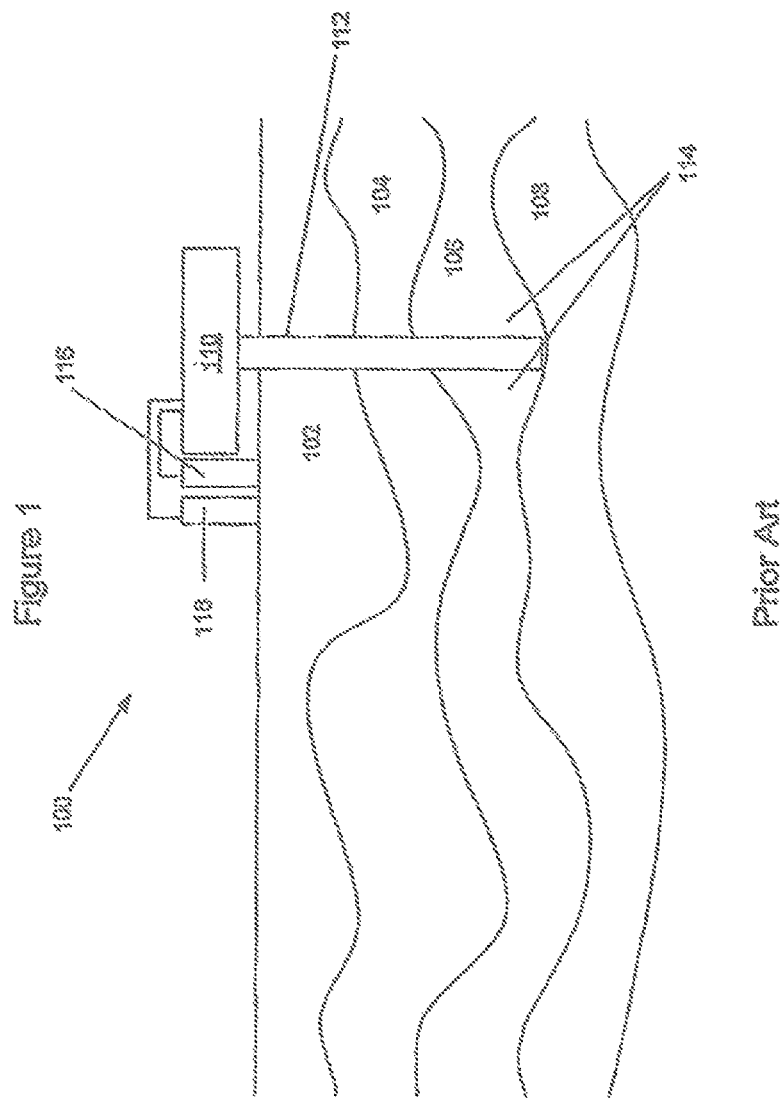

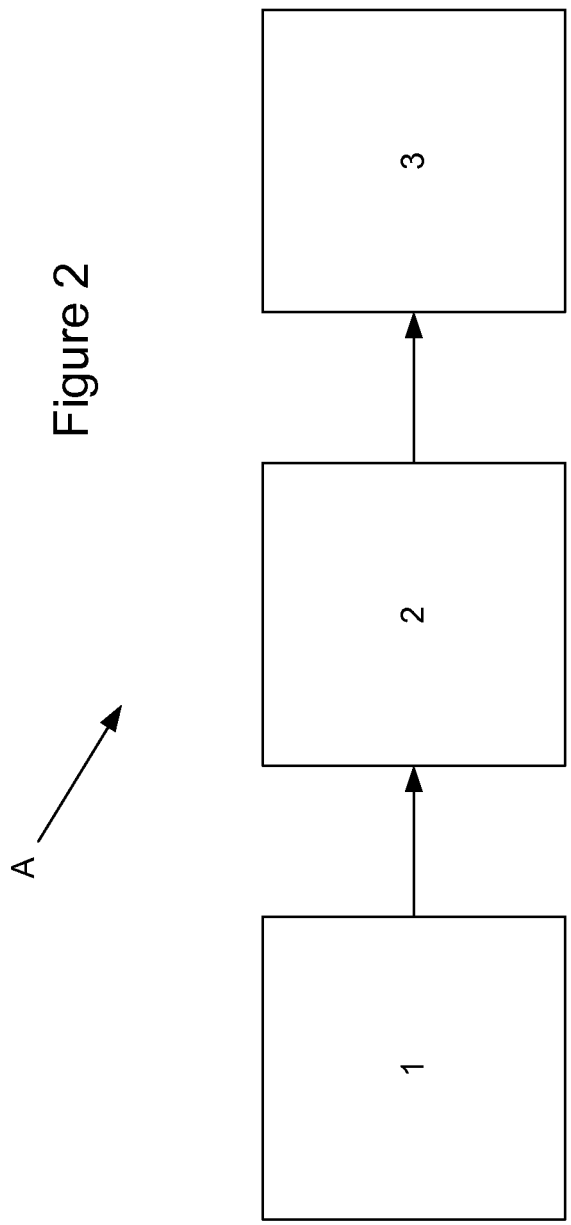

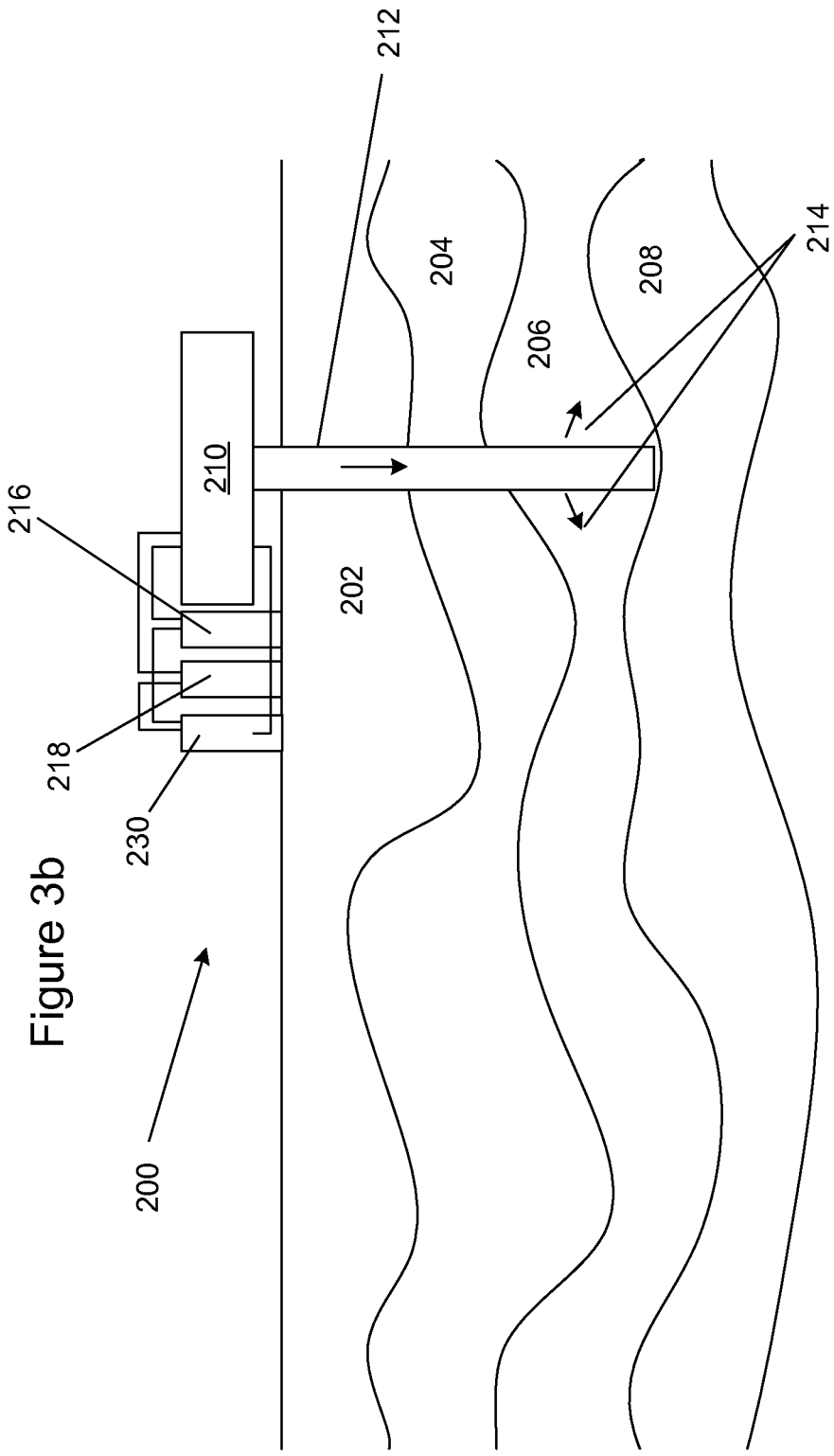

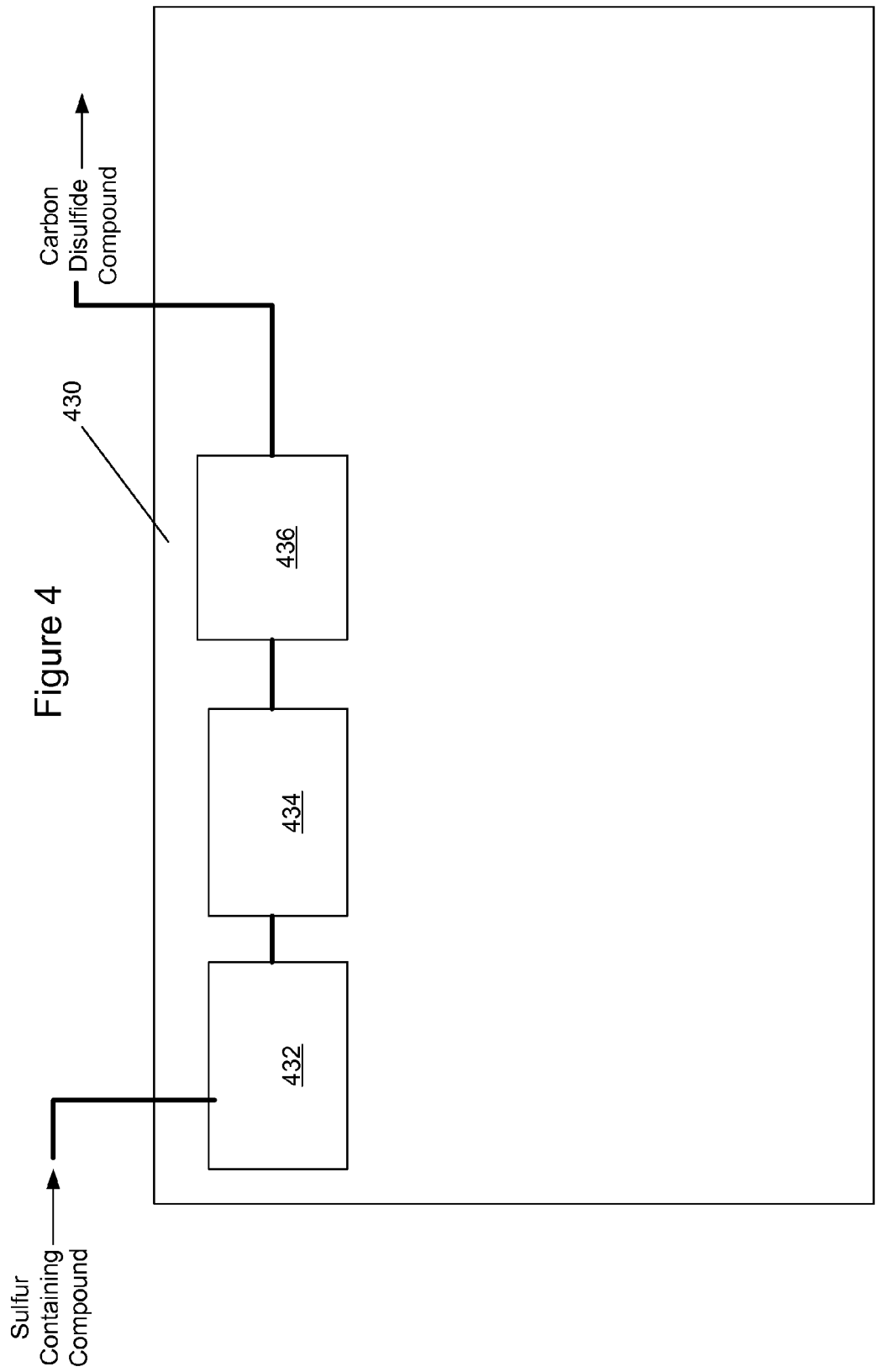

SYSTEMS AND METHODS FOR PRODUCING OIL AND/OR GAS

The present application claims priority of U.S. Provisional Patent Application No. 61/045,351 filed 16 Apr. 2008.

FIELD OF THE INVENTION

The present disclosure relates to systems and methods for producing oil and/or gas.

BACKGROUND OF THE INVENTION

Substantial amounts of sour natural gas are currently being produced from natural gas wells, oil wells (for example, as associated gas), and from natural gas storage reservoirs that have been infected with hydrogen sulfide-producing bacteria. The presence of hydrogen sulfide and other sulfur compounds in fuel and other gases has long been of concern for both the users and the producers of such gases. In addition to the corrosive and other adverse effects that such impurities have upon equipment and processes, noxious emissions are commonly produced from combustion of the natural gas as a result of oxidation of the sulfur compounds. The resulting sulfur oxides can be a major contributor to air pollution and may have detrimental impact upon the environment. Increasingly stringent federal and state regulations have accordingly been promulgated in an effort to reduce or eliminate sulfurous emissions, and a concomitant interest exists in efficiently removing from natural gas and the like the hydrogen sulfide that comprises a significant precursor of noxious emissions. In addition, one method of disposing of hydrogen sulfide has been to convert it into solid sulfur, for storage. Due to environmental and aesthetic concerns, many countries are now outlawing the formation of such sulfur stores.

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practiced form is a steamdrive, which reduces oil viscosity so that it can flow to the producing wells. Chemical flooding increases recovery by reducing the capillary forces that trap residual oil. Polymer flooding improves the sweep efficiency of injected water. Miscible gas injection works in a similar way to chemical flooding. By injecting a fluid that is miscible with the oil, trapped residual oil can be recovered.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and terminates in formation 106. The portion of formation 106 is shown at 114. Oil and gas are produced from formation 106 through well 112, to production facility 110. Gas and liquid are separated from each other, gas is stored in gas storage 116 and liquid is stored in liquid storage 118. Gas in gas storage 116 may contain hydrogen sulfide, which must be processed, transported, disposed of, or stored.

Co-Pending Patent Application Publication U.S. 2006/0254769 discloses a system including a mechanism for recovering oil and/or gas from an underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into a formation. Publication U.S. 2006/0254769 is herein incorporated by reference in its entirety.

There is a need in the art for improved systems and methods for processing, transportation, disposal, or storage of hydrogen sulfide from a liquid and/or gas. There is a need in the art for improved systems and methods for processing, transportation, disposal, or storage of sulfur from a liquid and/or gas. There is a further need in the art for improved systems and methods for enhanced oil recovery. There is a further need in the art for improved systems and methods for enhanced oil recovery using a sulfur compound, for example through viscosity reduction, chemical effects, and miscible flooding. There is a further need in the art for improved systems and methods for making sulfur containing enhanced oil recovery agents.

In addition, carbon disulfide is a common chemical with applications ranging from use as a commercial solvent for the production of rayon, to a raw material for the production of agricultural insecticides. The carbon disulfide manufacturing process involves the purchase and transport of both solid sulfur and natural gas (or another carbon source), often from long distances, to the manufacturing site and produces carbon disulfide at very high purity. These two factors—the high purchase and shipping costs of the raw materials, and the high purity of the final product—result in a relatively high production cost for carbon disulfide.

The manufacturing process for converting sour gas into solid sulfur involves a solvent unit to first remove hydrogen sulfide, other sulfur compounds, and contaminants such as carbon dioxide from the natural gas stream, followed by a Claus unit to convert the hydrogen sulfide into sulfur, which is then allowed to solidify prior to transport or transported as a liquid. The manufacturing process for manufacturing carbon disulfide, on the other hand, entails the heating, melting, and vaporization of solid or liquid sulfur and reacting its vapors with heated natural gas or another carbon source.

There is a need in the art for improved systems and methods for carbon disulfide manufacturing. There is a need in the art for improved systems and methods for more energy efficient carbon disulfide manufacturing. There is a need in the art for improved systems and methods for removing carbon disulfide from a reservoir at the conclusion of an EOR process.

SUMMARY OF THE INVENTION

In one aspect, the invention provides a system for producing oil and/or gas comprising a mechanism for releasing at least a portion of a sulfur containing compound into a formation; a first mechanism for converting at least a portion of the sulfur containing compound into a carbon disulfide formulation and/or a carbon oxysulfide formulation, the first mechanism for converting within the formation; and a second mechanism for converting at least a portion of the carbon disulfide formulation and/or a carbon oxysulfide formulation into another compound, the second mechanism for converting within the formation.

In another aspect, the invention provides a method for producing oil and/or gas comprising releasing a sulfur containing compound into a formation; converting at least a portion of the sulfur containing compound into a carbon disulfide formulation and/or a carbon oxysulfide formulation within the formation; and converting at least a portion of the carbon disulfide formulation and/or the carbon oxysulfide formulation into another compound within the formation.

Advantages of the invention include one or more of the following:

Improved systems and methods for disposing of hydrogen sulfide, sulfur, and/or other sulfur based compounds.

Improved systems and methods for enhanced recovery of hydrocarbons from a formation with a carbon disulfide formulation.

Improved systems and methods for enhanced recovery of hydrocarbons from a formation with a fluid containing a carbon disulfide formulation.

Improved systems and methods for producing a carbon disulfide formulation.

Improved carbon disulfide containing compositions for secondary recovery of hydrocarbons.

Improved systems and methods for processing, transportation, disposal, or storage of a sulfur compound from a liquid and/or gas.

Improved systems and methods for enhanced oil recovery.

Improved systems and methods for enhanced oil recovery using a sulfur compound.

Improved systems and methods for enhanced oil recovery using a compound which is miscible with oil in place.

Improved systems and methods for making and/or using sulfur containing enhanced oil recovery agents.

Improved systems and methods for removing carbon disulfide from a formation at the conclusion of an enhanced oil recovery process.

BRIEF DESCRIPTION OF THE DRAWINGS

FIG. 1 illustrates an oil and/or gas production system.
FIG. 2 illustrates an oil and/or gas production process.
FIGS. 3*a*-3*d* illustrate oil and/or gas production systems.
FIG. 4 illustrates a carbon disulfide formulation production process.

DETAILED DESCRIPTION OF THE INVENTION

Figure 3A:
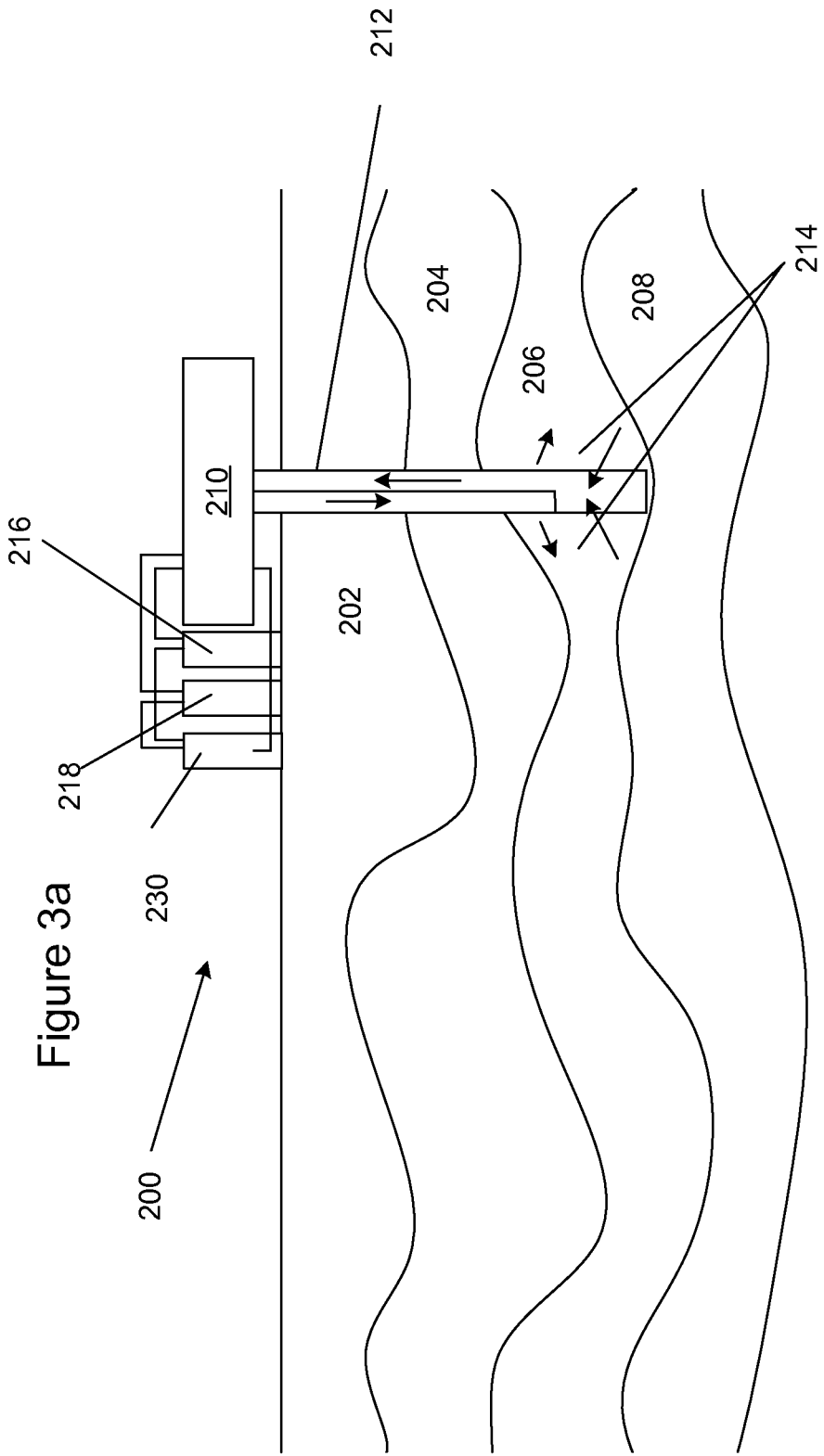

FIG. 2:

Referring now to FIG. 2, in one embodiment of the invention, process A for producing oil and/or gas, which includes disposing of a sulfur compound is illustrated. Process A includes step 1 where sulfur and/or a sulfur-containing compound may be released into a formation. In step 2, at least a portion of the sulfur compound is converted into a carbon disulfide formulation and/or a carbon oxysulfide formulation within the formation. In step 3, oil and/or gas is separated from the carbon disulfide formulation and/or the carbon oxysulfide formulation, and the oil recovered from the underground formation, and the carbon disulfide formulation and/or a carbon oxysulfide formulation is converted into another compound within the formation.

Step 1:

The release of the sulfur containing compound into the underground formation may be accomplished by any known method. Suitable methods include vertical and horizontal wells, perforating the formation, injecting liquid and/or vaporized elemental sulfur, or other methods for injecting liquids and gases into a formation as are known in the art. The selection of the method used to release the sulfur containing compound into the underground formation is not critical.

In some embodiments of the invention, the sulfur compound may include elemental sulfur, hydrogen sulfide, mercaptans, sulfides and disulfides other than hydrogen disulfide, or heterocyclic sulfur compounds for example thiophenes, benzothiophenes, or substituted and condensed ring dibenzothiophenes, or mixtures thereof.

Releasing at least a portion of the sulfur containing compound and/or other liquids and/or gases may be accomplished by any known method. One suitable method is injecting sulfur containing compound into a single conduit in a single well, allowing sulfur containing compound to soak, and then pumping out at least a portion of the gases and/or liquids. Another suitable method is injecting sulfur containing compound into a first conduit in a single well, and pumping out at least a portion of the gases and/or liquids through a second conduit in the single well. Another suitable method is injecting sulfur containing compound into a first well, and pumping out at least a portion of the gases and/or liquids through a second well. The selection of the method used to inject at least a portion of the sulfur containing compound and/or other liquids and/or gases is not critical.

Sulfur containing compound and/or other liquids and/or gases may be left to soak in a formation for a period of time from about 1 hour to about 15 days, for example from about 5 to about 50 hours.

In some embodiments, sulfur containing compound and/or other liquids and/or gases may be pumped into a formation at a pressure above the fracture pressure of the formation.

In some embodiments, sulfur containing compound or sulfur containing compound mixed with other components may be miscible in oil (or other liquids) and/or gases in a formation. In some embodiments, sulfur containing compound or sulfur containing compound mixed with other components may be immiscible in oil and/or gas in formation.

In some embodiments, sulfur containing compound may be heated prior to being injected into the formation to lower the viscosity of fluids in the formation, for example heavy oils, paraffins, asphaltenes, etc.

In some embodiments, sulfur containing compound may be heated and/or boiled while within the formation, with the use of a heated fluid or a heater, to lower the viscosity of fluids in the formation. In some embodiments, heated water and/or steam may be used to heat and/or vaporize the sulfur containing compound in the formation. Alternatively, a nonaqueous fluid could be substituted for steam or hot water as the heat medium to heat sulfur containing compound, for example a heavy aromatic solvent which may have its own solubilizing effect on reservoir hydrocarbons.

In some embodiments of the invention, in addition to injecting a sulfur containing compound into the formation, one or more catalysts for example as a slurry or suspension, oxygen or an oxygen containing gas, and one or more hydrocarbons may also be injected into the formation. Suitable catalysts, gases, and hydrocarbons which may be used in reactions within the formation are set forth below with regard to Step 2.

Step 2:

The conversion of at least a portion of the sulfur compound into a carbon disulfide and/or carbon oxysulfide formulation may be accomplished by any known method. Suitable methods may include an oxidation reaction of the sulfur compound to sulfur and/or sulfur dioxides, and by reaction of sulfur and/or sulfur dioxide with carbon and/or a carbon containing compound to form the carbon disulfide formulation. The selection of the method used to convert at least a portion of the sulfur compound into a carbon disulfide formulation is not critical.

In some embodiments of the invention, the carbon disulfide and/or carbon oxysulfide formulation may include carbon disulfide, carbon oxysulfide, and/or carbon disulfide derivatives for example, thiocarbonates, xanthates and mixtures thereof; and optionally one or more of the following: hydrogen sulfide, sulfur, carbon dioxide, hydrocarbons, and mixtures thereof.

In some embodiments of the invention, a carbon disulfide formulation is defined as a formulation having a molar ratio of carbon disulfide to carbon oxysulfide of greater than about 1.

In some embodiments of the invention, a carbon oxysulfide formulation is defined as a formulation having a molar ratio of carbon disulfide to carbon oxysulfide of about 1 or less.

In some embodiments of the invention, a carbon disulfide formulation may be used interchangeably with a carbon oxysulfide formulation, as the terms are defined above. For example, where the production, storage, and/or use of a carbon disulfide formulation are described below, the carbon disulfide formulation may be substituted with a carbon oxysulfide formulation.

In some embodiments of the invention, carbon disulfide formulation and/or carbon oxysulfide formulation production may have an input of a sulfur compound, for example injected directly into the formation.

In some embodiments of the invention, the sulfur compound may be converted into sulfur dioxide and/or sulfur by an oxidation reaction, for example by the Claus process, catalytic selective oxidation reaction, or by reaction with a metal as described hereinafter.

In some embodiments of the invention, the oxidation reaction may include reacting a sulfur compound with an oxygen containing gas in a reaction zone to yield sulfur dioxide and/or sulfur, among other components.

In some embodiments of the invention, the oxygen containing gas may be oxygen, air, oxygen-enriched air, or oxygen depleted air.

In some embodiments of the invention, the sulfur compound may be oxidized in the presence of a catalyst. Suitable catalysts may be present within or as part of the formation, including mineral compounds of elements such as aluminum, antimony, barium, bismuth, calcium, cerium, chromium, cobalt, copper, gallium, germanium, hafnium, iridium, iron, lanthanum, lead, magnesium, manganese, molybdenum, neodymium, nickel, niobium, osmium, palladium, platinum, praseodymium, rhenium, rhodium, ruthenium, samarium, scandium, silicon, silver, tantalum, tin, titanium, tungsten, vanadium, yttrium, zinc, zirconium, like oxides, sulfides, or carbides of these elements, and/or combinations or mixtures of two or more of the above.

In some embodiments, suitable catalysts, or precursors thereof, might be added to the formation. Suitable delivery methods to add catalyst precursors to the formation are via fluid injection, the fluid containing the catalyst precursor. The catalyst precursor can be part of the injection fluid as a liquid, a solution, a slurry, or a gas. Suitable catalyst precursors may contain elements such as titanium, vanadium, chromium, manganese, iron, cobalt, nickel, copper, zirconium, niobium, molybdenum or mixtures thereof. Suitable gaseous catalyst precursors may be compounds of the elements above such as halides and carbonyls or mixtures thereof. Suitable liquids include molten salts of carbonates, hydroxides and or halides or mixtures thereof such as eutectic melts. Suitable solutions may be aqueous solutions of the water-soluble salts of the elements above as nitrates, sulfates, and halides.

In some embodiments of the invention, the oxidation reaction may take place in the formation in a reaction zone having a temperature of less than about 500° C., for example from about 150 to about 500° C., or from about 200 to about 300° C., or above the dew point of sulfur, for given process conditions, so that sulfur does not condense onto the catalyst or in the reaction zone.

In some embodiments of the invention, the oxidation reaction may take place in the formation in a reaction zone having a pressure from about 100 to about 1000 kilopascals, for example from about 200 to about 500 kilopascals (absolute).

In some embodiments, a sulfur compound may be converted to sulfur and/or sulfur dioxide, for which processes are disclosed in U.S. patent application publication numbers 2004/0096381, 2004/0022721, 2004/0159583, 2003/0194366, 2001/0008619, 2002/0134706, 2004/0096381, 2004/0022721, 2004/0159583, and 2001/0008619, the disclosures of which are herein incorporated by reference in their entirety.

Sulfur and/or sulfur dioxide may be reacted with carbon or a carbon containing compound in the formation in a reaction zone to produce a carbon disulfide or carbon oxysulfide formulation.

In some embodiments, the carbon compound comprises carbon in any form, for example graphite, coal, charcoal, carbon monoxide, hydrocarbons for example natural gas, methane, ethane, propane, or heavier hydrocarbons, such as heavy oil, tar, tar sands, shales, asphaltenes, and/or bitumen.

In some embodiments, sulfur and/or sulfur dioxide may be combined with a carbon compound at temperatures from about 500 to about 900° C., for example from about 550 to 700° C.

In some embodiments, sulfur and/or sulfur dioxide may be combined with a carbon compound at a pressure from about 100 to about 500 kilopascals.

In some embodiments, sulfur and/or sulfur dioxide may be combined with a carbon compound in the presence of a catalyst. Suitable catalysts include silica-alumina catalysts, for example those containing from 2 to 10 percent by weight of silica; silica gel; bauxite; activated alumina; and in general those types of clay which are effective in the removal of color bodies and gum forming bodies from petroleum oils. The catalysts may additionally comprise one or more of vanadium, niobium, tantalum, chromium, molybdenum, tungsten, manganese, technetium, rhenium, iron, ruthenium, osmium, cobalt, rhodium, iridium, nickel, palladium, and/or platinum; in their elemental form, as compounds of the metals, or as oxides and sulfides. For example, oxides and sulfides of iron, vanadium, chromium, molybdenum, and manganese may be used as promoters in combination with silica gel, fuller's earth and/or activated alumina catalysts.

In some embodiments, a carbon disulfide formulation may be produced by reacting carbon with sulfur. The carbon may be obtained from hydrocarbons within the formation such as natural gas, crude oil, heavy oils, shale, tar sands, tar, asphalt, bitumen, and/or other hydrocarbons within the formation. Sulfur may be reacted with the carbon so as to produce carbon disulfide formulation, for example, sulfur in the liquid or vapor phase may be used for this reaction.

In some embodiments, sulfur and/or sulfur dioxide and a carbon compound may be converted to carbon disulfide formulation, processes for which are disclosed in U.S. Pat. Nos. 4,963,340, 2,636,810, 3,927,185, 4,057,613, and 4,822,938, and U.S. patent application publication number 2004/0146450, the disclosures of which are herein incorporated by reference in their entirety.

One suitable method of converting liquid sulfur and a hydrocarbon into a carbon disulfide formulation in the presence of oxygen is disclosed in WO 2007/131977.

One suitable method of converting liquid sulfur and a hydrocarbon into a carbon disulfide formulation in the presence of oxygen is disclosed in WO 2007/131977. WO 2007/131977 is herein incorporated by reference in its entirety.

As discussed above, the reaction inputs and/or catalysts may be found within the formation or injected into the formation in order to convert a sulfur containing compound into a carbon disulfide formulation and/or a carbon oxysulfide formulation.

Step 3:

The separation of oil and/or gas from a carbon disulfide and/or carbon oxysulfide formulation may be accomplished by any known method. Suitable methods include boiling off the carbon disulfide and/or carbon oxysulfide formulation, by increasing the temperature of the oil mixture. This will leave behind an elevated temperature oil with an increased mobility and lower viscosity to be produced. The temperature of the mixture can be increased by injecting steam or hot water, the use of in-situ heaters, or injecting another hot substance such as a liquid or a gas.

Another suitable method to separate the oil mixture is to hydrolyze the carbon disulfide and/or carbon oxysulfide formulation. This can be accomplished by injecting steam and/or hot water into contact with the oil mixture. This will leave behind an elevated temperature oil with an increased mobility and lower viscosity to be produced. In some embodiments, the steam and/or hot water may be basic or alkaline, for example by adding amines or ammonia or other bases to the water or steam.

Another suitable method to separate the oil mixture is to oxidize the carbon disulfide and/or carbon oxysulfide formulation. This can be accomplished by injecting oxygen, air, or other oxygen containing gases into contact with the oil mixture. This will leave behind an elevated temperature oil with an increased mobility and lower viscosity to be produced.

Another suitable method to separate the oil mixture is to strip the carbon disulfide and/or carbon oxysulfide formulation from the oil. This can be accomplished by injecting nitrogen or other suitable stripping gases or liquids into contact with the oil mixture. This will leave behind an oil to be produced.

The recovery of oil and/or gas from an underground formation may be accomplished by any known method. Suitable methods include subsea production, surface production, primary, secondary, or tertiary production. The selection of the method used to recover the oil and/or gas from the underground formation is not critical.

In one embodiment, oil and/or gas may be recovered from a formation into a well, and flow through the well and flowline to a facility. In some embodiments, enhanced oil recovery, with the use of an agent for example steam, water, a surfactant, a polymer flood, and/or a miscible agent such as a carbon disulfide formulation, may be used to increase the flow of oil and/or gas from the formation.

Sulfide Conversion:

Any carbon disulfide and/or carbon oxysulfide present in the formation may be converted into another compound while within the formation by any suitable method. The selection of the method to convert the carbon disulfide and/or carbon oxysulfide is not critical. Suitable methods to convert the carbon disulfide and/or carbon oxysulfide include the formation of hydrogen sulfide and oxidation, which are set forth below.

Hydrogen Sulfide Formation:

In one example, the miscible solvent may include a carbon disulfide and/or carbon oxysulfide formulation. The carbon disulfide may be hydrolyzed within the formation into hydrogen sulfide and/or carbon disulfide formulation, for example by reaction with water and/or steam. Optionally, one or more catalysts such as alumina and/or titania, for example in a solution, as a powder, or as a suspension in water or other fluids may be introduced into the formation in order to catalyze the reaction from carbon disulfide to hydrogen sulfide.

The carbon disulfide can be hydrolyzed to hydrogen sulfide and/or carbon oxysulfide by any reaction or mechanism. The selection of the reaction or mechanism is not critical. One suitable mechanism by which the carbon disulfide is hydrolyzed to hydrogen sulfide is a known reaction, which has the formula:

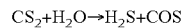

$$CS_2 + H_2O \rightarrow H_2S + COS \qquad \text{(Formula 1)}$$

The carbon disulfide may be hydrolyzed further within the formation into carbon dioxide and hydrogen sulfide, for example by reaction with water or steam.

The carbon oxysulfide can be hydrolyzed to hydrogen sulfide and carbon dioxide by any reaction or mechanism. The selection of the reaction or mechanism is not critical. One suitable mechanism by which the carbon oxysulfide is hydrolyzed to hydrogen sulfide is a known reaction, which has the formula:

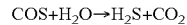

$$COS + H_2O \rightarrow H_2S + CO_2 \qquad \text{(Formula 2)}$$

The hydrogen sulfide may then be recovered from one or more wells. In order to recover the hydrogen sulfide from the formation, water, air, carbon dioxide, or one or more other liquids or gases or remediation agents may be injected into the formation to aid in the recovery of the hydrogen sulfide from a well.

Oxidation Reactions:

In one example, the miscible solvent may include an alcohol and/or hydrocarbon such as natural gas, propane, butane, and/or pentane. The miscible solvent may be burned in place within the formation into primarily water and carbon dioxide, for example by the addition of oxygen, steam, peroxides, and/or heat.

In another example, the miscible solvent may include a carbon disulfide formulation. The carbon disulfide may be combusted or oxidized within the formation into sulfur dioxide and/or carbon dioxide, for example by the addition of oxygen and/or peroxides, with the optional addition of heat to start and/or increase the rate of the reaction.

The carbon disulfide can be oxidized by any reaction or mechanism. The selection of the reaction or mechanism is not critical. One suitable mechanism by which the carbon disulfide is oxidized to sulfur dioxide is a known reaction, which has the formula:

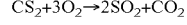

$$CS_2 + 3O_2 \rightarrow 2SO_2 + CO_2 \qquad \text{(Formula 3)}$$

The sulfur dioxide may then be recovered from one or more wells. In order to recover the sulfur dioxide from the formation, water, air, carbon dioxide, or one or more other liquids or gases or remediation agents may be injected into the formation to aid in the recovery of the sulfur dioxide from a well.

FIG. 3a:

Referring now to FIG. 3a, in one embodiment of the invention, system 200 is illustrated. System 200 includes underground formation 202, underground formation 204, underground formation 206, and underground formation 208. Production facility 210 is provided at the surface. Well 212 traverses formations 202 and 204, and has openings in formation 206. Portions 214 of formation 206 may optionally be fractured and/or perforated. Oil and gas from formation 206 is produced into portions 214, into well 212, and travels up to production facility 210. Production facility may then separate gas, which is sent to gas processing 216, and liquid, which is sent to liquid storage 218. Production facility also includes carbon disulfide formulation storage 230. Carbon disulfide, hydrogen sulfide and/or other sulfur containing compounds produced from well 212 may be sent to carbon disulfide formulation production 230. Sulfur containing compound is pumped down well 212 that is shown by the down arrow and is pumped into formation 206, is converted into a carbon disulfide formulation, and is then separated and the oil and gas produced back up well 212 to production facility 210.

Figure 3C:
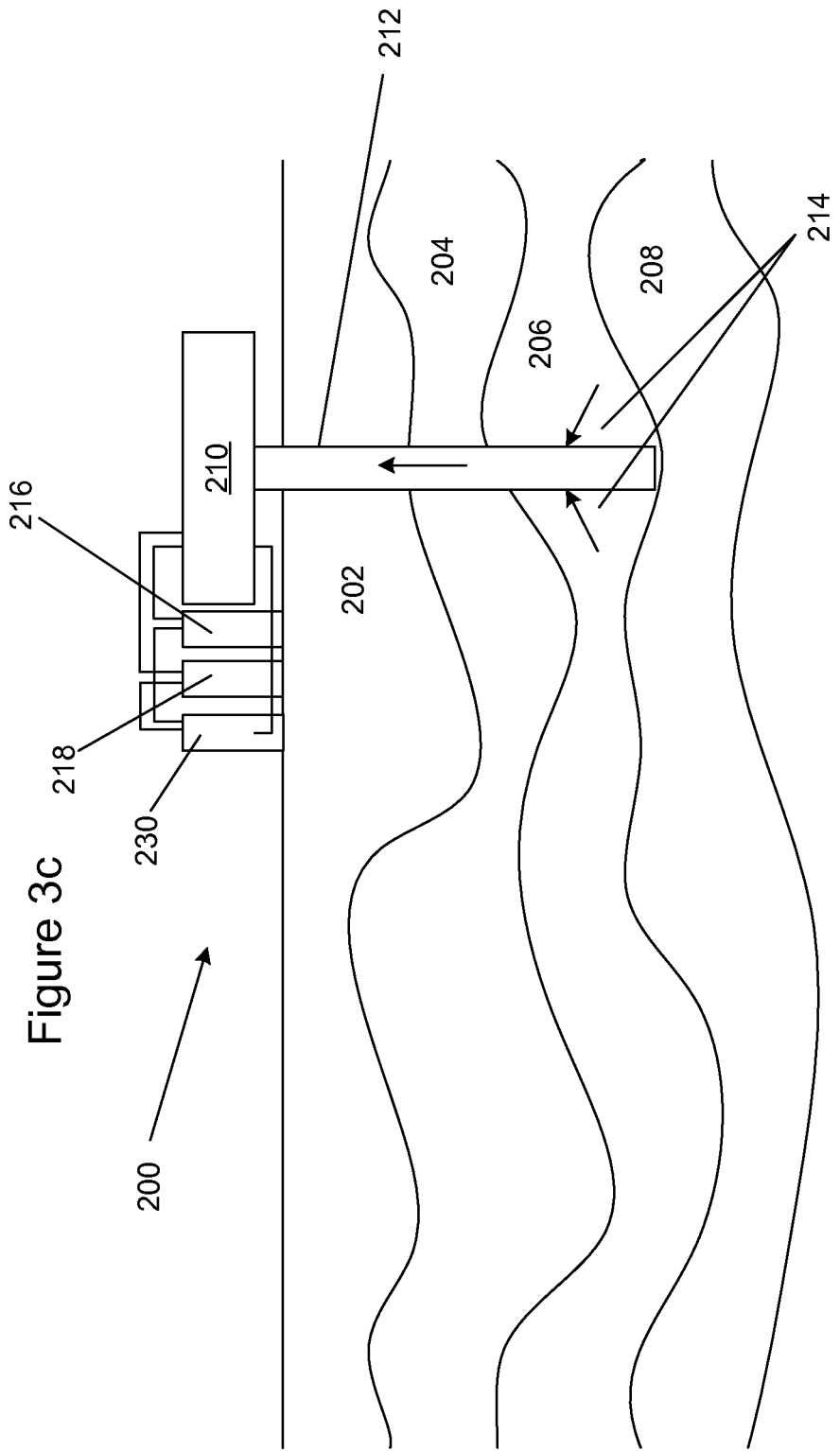

FIGS. 3b & 3c:

Referring now to FIGS. 3b and 3c, in some embodiments of the invention, system 200 is illustrated. System 200 includes underground formation 202, underground formation 204, underground formation 206, and underground formation 208. Production facility 210 is provided at the surface. Well 212 traverses formations 202 and 204, and has openings in formation 206. Portions 214 of formation 206 may be optionally fractured and/or perforated. During primary production, oil and gas from formation 206 is produced into portions 214, into well 212, and travels up to production facility 210. Production facility then separates gas, which is sent to gas processing 216, and liquid, which is sent to liquid storage 218. Production facility also includes carbon disulfide formulation storage 230. Carbon disulfide formulation, hydrogen sulfide and/or other sulfur containing compounds may be separated from oil and/or gas within the formation, before the oil and/or gas is produced into well 212. As shown in FIG. 3b, sulfur containing compound, other liquids, gases, and/or catalysts may be pumped down well 212 that is shown by the down arrow and pumped into formation 206. Sulfur containing compound formulation may be left to soak in formation for a period of time from about 1 hour to about 15 days, for example from about 5 to about 50 hours, in order to react with hydrocarbons to form a carbon disulfide formulation.

After the soaking/reaction period, as shown in FIG. 3c, carbon disulfide formulation is separated from the oil and/or gas, and then the oil and/or gas is produced back up well 212 to production facility 210.

In some embodiments, sulfur containing compound may be pumped into formation 206 above the fracture pressure of the formation, for example from about 120% to about 200% of the fracture pressure.

Sulfur containing compound may be pumped into formation 206 at a temperature from about 200 to about 1000° C., for example from about 400 to about 800° C., or from about 500 to about 700° C.

Sulfur containing compound may be pumped into formation 206 at a pressure from about 2 to about 200 bars, for example from about 3 to about 100 bars, or from about 5 to about 50 bars.

Figure 3D:
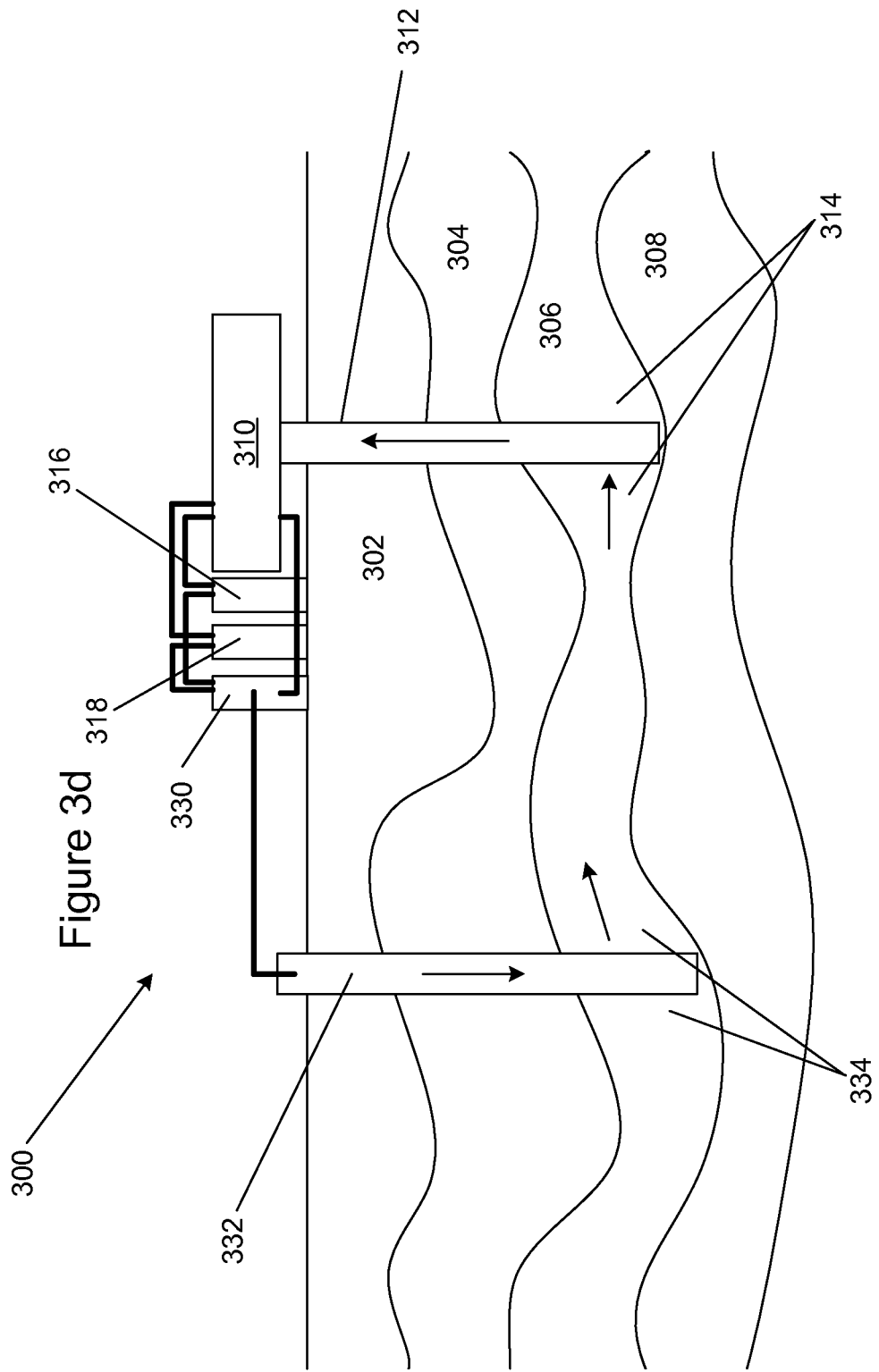

FIG. 3d:

Referring now to FIG. 3d, in some embodiments of the invention, system 300 is illustrated. System 300 includes underground formation 302, formation 304, formation 306, and formation 308. Production facility 310 is provided at the surface. Well 312 traverses formation 302 and 304 has openings at formation 306. Portions of formation 314 may be optionally fractured and/or perforated. As oil and gas is produced from formation 306 it enters portions 314, and travels up well 312 to production facility 310. Gas and liquid may be separated, and gas may be sent to gas storage 316, and liquid may be sent to liquid storage 318. Production facility 310 is able to store and/or produce carbon disulfide formulation, which may be produced and stored in carbon disulfide formulation production 330. Carbon disulfide formulation, hydrogen sulfide and/or other sulfur containing compounds may be separated from oil and/or gas, before the oil and/or gas produced to well 312. Carbon disulfide formulation may also be optionally converted to another chemical within the formation, as described above.

Sulfur containing compound, and optionally other liquids, gases, and/or catalysts are pumped down well 332, to portions 334 of formation 306. Sulfur containing compound traverses formation 306 and reacts with one or more hydrocarbons to make a carbon disulfide and/or carbon oxysulfide formulation, which aids in the production of oil and gas, and then the carbon disulfide formulation and oil and/or gas are separated, and the oil and/or gas may be produced to well 312, to production facility 310. Carbon disulfide formulation may then be converted within the formation, for example by boiling or hydrolyzing the carbon disulfide formulation, or reacting it, then leaving the converted carbon disulfide formulation in the formation.

In some embodiments, carbon disulfide formulation or carbon disulfide formulation mixed with other components may be miscible in oil and/or gas in formation 306.

In some embodiments, carbon disulfide formulation or carbon disulfide formulation mixed with other components may be mixed in with oil and/or gas in formation 306 to form a miscible mixture. The mixture may then be separated, and the oil and/or gas produced to well 312.

In some embodiments, carbon disulfide formulation or carbon disulfide formulation mixed with other components may not mix in with oil and/or gas in formation 306, so that carbon disulfide formulation or carbon disulfide formulation mixed with other components travels as a plug across formation 306 to force oil and/or gas to well 312. In some embodiments, a quantity of carbon disulfide formulation or carbon disulfide formulation mixed with other components may be injected into well 332, followed by another component to force carbon disulfide formulation or carbon disulfide formulation mixed with other components across formation 306, for example air; water in gas or liquid form; water mixed with one or more salts, polymers, and/or surfactants; carbon dioxide; other gases; other liquids; and/or mixtures thereof.

FIG. 4:

Referring now to FIG. 4, in some embodiments of the invention, carbon disulfide formulation production 430 is illustrated. Carbon disulfide formulation production 430 has an input of hydrogen sulfide and/or other sulfur containing compounds. Hydrogen sulfide may be converted into sulfur dioxide by oxidation reaction 432. Hydrogen sulfide and sulfur dioxide may be converted to sulfur at 434. Sulfur may be combined with a carbon compound to produce carbon disulfide formulation at 436. The carbon disulfide formulation and hydrogen sulfide produced at 436 may be the output. Carbon disulfide formulation and/or a carbon disulfide formulation containing mixture may be the output from carbon disulfide formulation production 430.

Alternatives:

In some embodiments, carbon disulfide derived salts can be dissolved in water, and the resulting solution pumped into formations 206 and/or 306. The dissolved carbon disulfide formulations may decompose, yielding carbon disulfide in formations 206 and/or 306.

In some embodiments of the invention, gas and liquid produced from well 212 and/or 312 may be separated, for example with a gravity separator or a centrifuge, or with other methods known in the art. The gas portion may be sent to carbon disulfide formulation production 230 and/or 330.

In some embodiments of the invention, all of the components of system 200 and/or system 300 may be within about 10 km of each other, for example about 5, 3, or 1 km.

In some embodiments, oil and/or gas produced from well 212 and/or 312 may be transported to a refinery and/or a treatment facility. The oil and/or gas may be processed to produced to produce commercial products such as transportation fuels such as gasoline and diesel, heating fuel, lubricants, chemicals, and/or polymers. Processing may include distilling and/or fractionally distilling the oil and/or gas to produce one or more distillate fractions. In some embodiments, the oil and/or gas, and/or the one or more distillate fractions may be subjected to a process of one or more of the following: catalytic cracking, hydrocracking, hydrotreating, coking, thermal cracking, distilling, reforming, polymerization, isomerization, alkylation, blending, and dewaxing.

It is to be appreciated that any of the embodiments to complete Step 1 may be combined with any of the embodiments to complete Step 2, which may be combined with any of the embodiments to complete Step 3.

The selection of a method to complete any of Steps 1-3 is not critical.

Illustrative Embodiments

In one embodiment of the invention, there is disclosed a system for producing oil and/or gas comprising a mechanism for releasing at least a portion of a sulfur containing compound into a formation; a first mechanism for converting at least a portion of the sulfur containing compound into a carbon disulfide formulation and/or a carbon oxysulfide formulation, the first mechanism for converting within the formation; and a second mechanism for converting at least a portion of the carbon disulfide formulation and/or a carbon oxysulfide formulation into another compound, the second mechanism for converting within the formation. In some embodiments, the system also includes a mechanism for recovering oil and/or gas from the formation. In some embodiments, the mechanism for recovering comprises a well in the underground formation and a recovery facility at a topside of the well. In some embodiments, the mechanism for recovering comprises a first well drilled in the underground formation for recovering the oil and/or gas, and a production facility at a topside of the first well; and/or the mechanism for releasing the sulfur containing compound comprises a second well in the underground formation for releasing the sulfur containing compound into the formation. In some embodiments, the system also includes a mechanism for injecting a carbon disulfide formulation and/or a carbon oxysulfide formulation into the formation. In some embodiments, the system also includes a mechanism for injecting a catalyst into the formation. In some embodiments, the mechanism for releasing at least a portion of a sulfur containing compound further comprises a heater adapted to heat the sulfur containing compound. In some embodiments, the system also includes a heater within the formation adapted to heat at least one of the sulfur containing compound, oil, and/or gas. In some embodiments, the system also includes a separator within the formation adapted to separate the carbon disulfide formulation and/or a carbon oxysulfide formulation from other fluids within the formation. In some embodiments, the system also includes a mechanism adapted to convert the separated carbon disulfide formulation and/or the produced carbon oxysulfide formulation into another compound within the formation. In some embodiments, the mechanism to convert comprises a mechanism to produce hydrogen sulfide and/or a mechanism to oxidize.

In one embodiment of the invention, there is disclosed a method for producing oil and/or gas comprising releasing a sulfur containing compound into a formation; converting at least a portion of the sulfur containing compound into a carbon disulfide formulation and/or a carbon oxysulfide formulation within the formation; and converting at least a portion of the carbon disulfide formulation and/or the carbon oxysulfide formulation into another compound within the formation. In some embodiments, the method also includes recovering oil and/or gas from the underground formation. In some embodiments, the oil and/or gas comprises a sulfur compound. In some embodiments, the method also includes separating carbon disulfide formulation and/or carbon oxysulfide formulation from the oil and/or gas, within the formation. In some embodiments, the method also includes heating the sulfur containing compound prior to injecting the sulfur containing compound into the formation, or while within the formation. In some embodiments, converting the sulfur containing compound into the carbon disulfide formulation comprises reacting at least a portion of the sulfur containing compound with a hydrocarbon within the formation to form the carbon disulfide formulation. In some embodiments, the method also includes injecting another material into the formation, the another material selected from the group consisting of air, oxygen, water in the form of liquid and/or vapor, one or more catalysts, and/or mixtures thereof. In some embodiments, the sulfur containing compound is injected at a pressure from 0 to 37,000 kilopascals above the initial reservoir pressure, measured prior to when the sulfur containing compound injection begins. In some embodiments, any oil, as present in the underground formation prior to the injecting the sulfur containing compound, has a viscosity from 0.14 cp to 6 million cp, for example a viscosity from 0.3 cp to 30,000 cp, or from 5 cp to 5,000 cp. In some embodiments, the underground formation comprises a permeability from 0.0001 to 15 Darcies, for example a permeability from 0.001 to 1 Darcy. In some embodiments, the method also includes converting at least a portion of a recovered oil and/or gas from the formation into a material selected from the group consisting of transportation fuels such as gasoline and diesel, heating fuel, lubricants, chemicals, and/or polymers.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

That which is claimed is:

1. A system for producing oil or gas comprising:
    a mechanism for releasing at least a portion of a sulfur containing compound into a formation;
    a first mechanism for converting at least a portion of the sulfur containing compound into a carbon disulfide formulation or a carbon oxysulfide formulation by reaction of the sulfur containing compound with a hydrocarbon, the first mechanism for converting within the formation; and
    a second mechanism for converting at least a portion of the carbon disulfide formulation or a carbon oxysulfide formulation into another compound, the second mechanism for converting within the formation.

2. The system of claim 1, further comprising a mechanism for recovering oil or gas from the formation.

3. The system of claim 2, wherein the mechanism for recovering comprises a well in the underground formation and a recovery facility at a topside of the well.

4. The system of claim 2, wherein the mechanism for recovering comprises a first well drilled in the underground formation for recovering the oil or gas, and a production facility at a topside of the first well; and wherein the mechanism for releasing the sulfur containing compound comprises a second well in the underground formation for releasing the sulfur containing compound into the formation.

5. The system of claim 1, further comprising a mechanism for injecting a carbon disulfide formulation or a carbon oxysulfide formulation into the formation.

6. The system of claim 1, further comprising a mechanism for injecting a catalyst into the formation.

7. The system of claim 1, wherein the mechanism for releasing at least a portion of a sulfur containing compound further comprises a heater adapted to heat the sulfur containing compound.

8. The system of claim 1, further comprising a heater within the formation adapted to heat at least one of the sulfur containing compound, oil, or gas.

9. The system of claim 1, further comprising a separator within the formation adapted to separate the carbon disulfide formulation or a carbon oxysulfide formulation from other fluids within the formation.

10. The system of claim 9, further comprising a mechanism adapted to convert the separated carbon disulfide formulation or the separated carbon oxysulfide formulation into another compound within the formation.

11. The system of claim 10, wherein the mechanism to convert comprises a mechanism to produce hydrogen sulfide or a mechanism to oxidize.

12. A method for producing oil or gas comprising:
releasing a sulfur containing compound into a formation;
converting at least a portion of the sulfur containing compound into a carbon disulfide formulation or a carbon oxysulfide formulation within the formation by reacting at least a portion of the sulfur containing compound with a hydrocarbon within the formation to form the carbon disulfide formulation or the carbon oxysulfide formulation; and
converting at least a portion of the carbon disulfide formulation or the carbon oxysulfide formulation into another compound within the formation.

13. The method of claim 12, further comprising recovering oil or gas from the underground formation.

14. The method of claim 13, wherein the oil or gas comprises a sulfur compound.

15. The method of claim 13, further comprising separating the carbon disulfide formulation or the carbon oxysulfide formulation from the oil or gas, within the formation.

16. The method of claim 12, further comprising heating the sulfur containing compound prior to injecting the sulfur containing compound into the formation, or while within the formation.

17. The method of claim 12, further comprising injecting another material into the formation, the another material selected from the group consisting of air, oxygen, water in the form of liquid and/or vapor, one or more catalysts, and mixtures thereof.

18. The method of claim 12, wherein the sulfur containing compound is injected at a pressure from 0 to 37,000 kilopascals above the initial reservoir pressure, measured prior to when the sulfur containing compound injection begins.

19. The method of claim 12, wherein any oil, as present in the underground formation prior to the injecting the sulfur containing compound, has a viscosity from 0.14 cp to 6 million cp.

20. The method of claim 12, wherein the underground formation comprises a permeability from 0.0001 to 15 Darcies.

21. The method of claim 12, further comprising converting at least a portion of a recovered oil or gas from the formation into a transportation fuel.

* * * * *